Figures 1, 2:
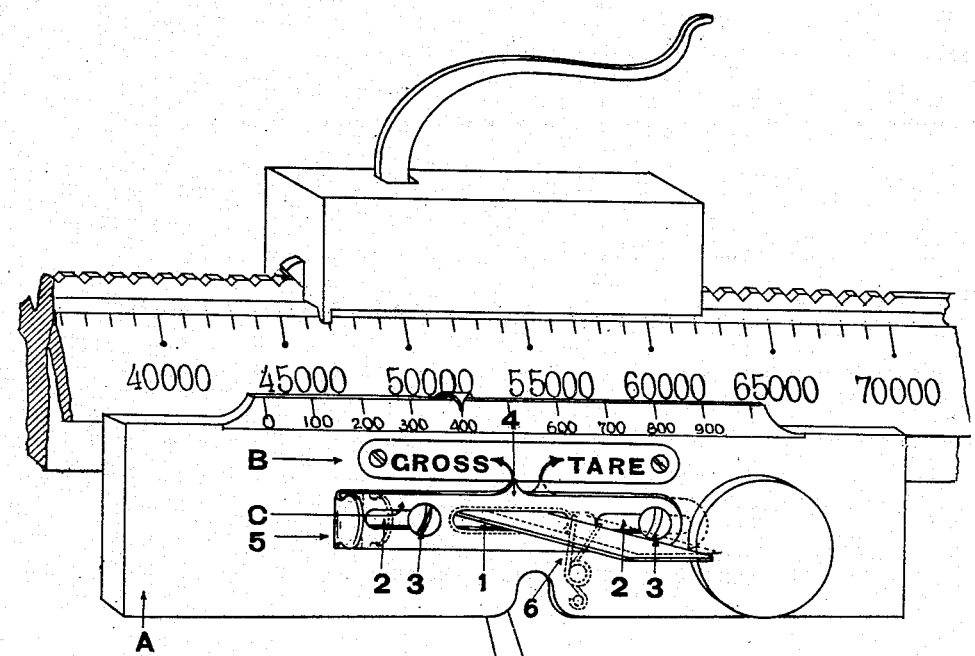

No. 674,802. Patented May 21, 1901.
F. W. TAYLOR.
TICKET HOLDER AND INDICATOR PLATE.
(Application filed Nov. 29, 1899.)
(No Model.)

WITNESSES:
Willis H. Sargent
Frank O. French

Frederick W. Taylor, INVENTOR

C. S. Sturtevant
ATTORNEY

THE NORRIS PETERS CO., PHOTO-LITHO., WASHINGTON, D. C.

UNITED STATES PATENT OFFICE.

FREDERICK W. TAYLOR, OF ST. JOHNSBURY, VERMONT, ASSIGNOR TO THE
E. & T. FAIRBANKS CO., OF SAME PLACE.

TICKET-HOLDER AND INDICATOR-PLATE.

SPECIFICATION forming part of Letters Patent No. 674,802, dated May 21, 1901.

Application filed November 29, 1899. Serial No. 738,670. (No model.)

*To all whom it may concern:*

Be it known that I, FREDERICK W. TAYLOR, a citizen of the United States, residing at St. Johnsbury, in the county of Caledonia, State of Vermont, have invented certain new and useful Improvements in Ticket-Holders and Indicator-Plates, of which the following is a description, reference being had to the accompanying drawings, and to the letters and figures of reference marked thereon.

My invention relates to printing or registering beams for weighing-scales, particularly of the type illustrated in Letters Patent of the United States granted Henry Fairbanks, January 18, 1898, No. 597,640, and the object is to provide a ticket-holder and indicator-plate in the use of which after the gross weight has been taken and the load discharged the tare may be taken by moving the poise to rebalance the scale and then reinserting the ticket and moving the indicator sidewise, so as to bring that portion of the ticket upon which the tare is to be printed directly in proper position beneath the tare-weight numerals, so that the tare-figures on the ticket will be directly under the gross-figures and the weight of the load thus ascertained.

The invention therefore consists in the combination, with a printing-beam, its poise, &c., of a ticket-holder having a limited movement to bring a fresh portion of the ticket beneath the type on the beam, whereby in the first position of the holder the gross weight may be printed on the ticket and when the holder is moved another portion of the ticket may be printed.

Finally, the invention consists in the matters hereinafter described, and referred to in the appended claims.

The invention is illustrated in the accompanying drawings, in which—

Figure 1 is a front view of the ticket-holder and indicator-plate, and Fig. 2 is a cross-section of the same.

In the drawings, A indicates a portion of the front face of the main poise of a printing-beam, upon which is arranged a plate B, with the symbols "Gross" and "Tare" thereon, the former on the left and the latter on the right.

C is the ticket-holder and indicator-plate, having the slot 1 for the reception of the ticket and the slots 2 2, through which pass screws 3 3, securing the plate C to the face of the poise and by means of which slots and screws it is guided in its movements. At the top of the plate C is a pointer which normally points to the word "Gross" on the plate B.

A finger or thumb piece 5 is attached to or formed with the plate C, and by means of this the said plate may be slid to the right, to the limit allowed by the slots 2, to bring the pointer 4 in position to indicate "tare," the plate C being normally kept in its left-hand position by means of the spring 6, secured to the inner face of the poise and bearing on the projecting pin 7, which is secured to the plate C and passes through the front plate of the poise.

Assuming a construction of registering-beam scale similar to that of the patent above referred to or my Patent No. 597,697, of January 18, 1898, in which the main beam, the main-poise slide, and auxiliary-poise slide, if there be such, are provided with printing-numerals arranged so that their lower edges are level, the operation of the device is as follows: The gross load is weighed in the ordinary way, by moving the poise along the beam and the poise slide or slides along the main poise until the proper balance is reached and the ticket is inserted and printed, thus giving the gross weight, the ticket-holder C being held in its normal position. After the load has been discharged and the tare is to be taken the scale is again properly balanced, the ticket again inserted, and the indicator-plate pushed to the right, when it assumes the position indicated by dotted lines, with the pointer at "Tare." This brings a fresh portion of the ticket beneath the type-numerals, and when printed the tare-figures are directly under the gross-figures. A mental calculation then gives the net weight of the load. When the plate is released, the spring automatically forces it back to its original position. In a weighing-scale it would not answer to have this indicator-plate in either one of the two positions when the load is being weighed, as it would throw the beam just so much out of balance. By my mechanism the load is always weighed with the indicator-plate at the left of the slot, with the pointer at "Gross," and the plate is only moved to the right after the weighing has been done, but when the tare impression is to be taken.

It will be understood that while it is desirable to use the automatic means for returning the indicator-plate and ticket-holder to its original position such arrangement is not absolutely necessary, as it may be moved to both positions by positive action on the part of the operator. Furthermore, other details may be changed without departing from the spirit of the invention.

Having thus described my invention, what I claim, and desire to secure by Letters Patent, is—

1. In a printing or registering weighing-scale, in combination with a beam and a poise sliding thereon, a ticket-holder on said poise, and means for adjusting said ticket-holder longitudinally in the poise without removing it from the poise to bring different portions of the ticket into position to receive impressions; substantially as described.

2. In a printing or registering beam for weighing-scales, the combination with the main poise, of a plate slidable longitudinally thereon adapted to receive a ticket, whereby the position of the ticket with respect to the registering numerals may be varied; substantially as described.

3. In a printing or registering beam for weighing-scales, the combination with a poise sliding thereon, a plate slidable longitudinally on the poise, having means for the reception of a ticket, said plate being normally held in one position, and automatic means for returning it to that position after it has been partially removed therefrom; substantially as described.

4. The herein-described ticket-holder and indicator-plate for weighing-scales, comprising a slidable plate on the main poise, having pointers indicating gross and tare weight, said plate being normally in position to indicate gross weight, means for imparting to same a limited sliding movement for the purpose of indicating tare weight, and means for returning said plate to its normal position; substantially as described.

5. The herein-described device for indicating on a ticket gross and tare weight comprising a plate slidable longitudinally on the main poise adapted when in normal position to hold the ticket beneath the type-numerals, indicating gross weight, and adapted, when moved beyond that position to bring a fresh portion of the ticket beneath other type-numerals to indicate tare weight; substantially as described.

6. In a weighing-scale, in combination with the movable poise, a plate slidable longitudinally on said poise and having means for the reception of a ticket, said plate having a limited sliding movement whereby when the same is in one position, the ticket contained in the holder will receive certain impressions from the type-numerals, and when in the other position will receive other impressions; substantially as described.

In testimony whereof I affix my signature in presence of two witnesses.

FREDERICK W. TAYLOR.

Witnesses:
WILLIS H. SARGENT,
FRANK O. FRENCH.